United States Patent [19]

Ruehle

[11] 4,380,059
[45] Apr. 12, 1983

[54] F-K FILTERING OF MULTIPLE REFLECTIONS FROM A SEISMIC SECTION

[75] Inventor: William H. Ruehle, Duncanville, Tex.

[73] Assignee: Mobil Oil Corporation, New York, N.Y.

[21] Appl. No.: 220,881

[22] Filed: Dec. 29, 1980

Related U.S. Application Data

[63] Continuation-in-part of Ser. No. 179,748, Aug. 20, 1980, abandoned.

[51] Int. Cl.³ .......................... G01V 1/32; G01V 1/36
[52] U.S. Cl. ...................................... 367/46; 367/24; 364/421
[58] Field of Search ...................... 367/24, 46, 49, 62; 364/421

[56] References Cited

U.S. PATENT DOCUMENTS

| | | | |
|---|---|---|---|
| 3,396,365 | 8/1968 | Kerns | 367/46 |
| 3,424,269 | 1/1969 | Schroeder | 367/46 |
| 3,550,073 | 12/1970 | Foster et al. | 367/24 |
| 3,581,274 | 5/1971 | Ruehle | 367/24 |
| 3,689,874 | 9/1972 | Foster et al. | 367/46 |
| 4,152,649 | 5/1979 | Choquet | 364/726 |
| 4,218,765 | 8/1980 | Kinkade | 364/421 |
| 4,223,399 | 9/1980 | Hackett | 367/46 |
| 4,241,429 | 12/1980 | Bloomquist et al. | 364/421 |
| 4,293,935 | 10/1981 | Gros et al. | 367/49 |
| 4,314,364 | 2/1982 | Bickel | 364/421 |

FOREIGN PATENT DOCUMENTS 972862  8/1975  Canada ............................ 367/46

OTHER PUBLICATIONS

Faust, "Some Technological Aspects of Exploration Effectiveness", 9/17/62, pp. 1–7, Geophysics, vol. 28, #1.

*Primary Examiner*—Nelson Moskowitz
*Attorney, Agent, or Firm*—Charles A. Huggett; Michael G. Gilman; George W. Hager

[57] ABSTRACT

Multiple reflections are filtered from seismograms by transforming them into an f-k array representing amplitude as a function of frequency and wave number. The inverse of the f-k transform of the multiple reflections is generated. The f-k array of the seismograms is filtered by weighting all samples with the inverse of the f-k transform of the multiple reflections.

2 Claims, 10 Drawing Figures

F-K FILTERING OF MULTIPLE REFLECTIONS FROM A SEISMIC SECTION

RELATED APPLICATIONS

This application is a continuation-in-part of application Ser. No. 179,748, filed Aug. 20, 1980, "F-K Geophysical Operations Including Filtering of Seismic Records", now abandoned.

BACKGROUND OF THE INVENTION

This invention relates to geophysical exploration and more particularly to the filtering of multiple reflections from a seismic section.

A seismic section is a set of seismograms which depicts the subsurface layering of a section of the earth. It is the principal tool which the geophysicist studies to determine the nature of the earth's subsurface formations. Before an array of seismic samples can be converted into a seismic section which can be interpreted by the geophysicist, the seismograms must be processed to remove noise. One of the most frequently occuring types of noise is multiple reflections. These are caused by multiple "bounces" of the seismic energy between reflecting layers in the earth.

Various processes have been devised for suppressing multiple reflections. In one such process, multiple seismic coverage is obtained and stacked to suppress the multiple reflections. Various names have been given to the general process of obtaining multiple seismic coverage, e.g., common depth point techniques, common reflection point techniques, and roll-along techniques. All of these techniques involve the general principle of recording multiple seismic data from the same reflection point in the subsurface by employing variable horizontal spacing between a seismic source and seismic detector. These techniques are applicable to both marine and land seismic work. A description of such techniques is given by Lorenz Shock in an article entitled "Roll-Along and Drop-Along Seismic Techniques", published in GEOPHYSICS, Vol. XXVIII, No. 5, Part II, pp. 831–841, October, 1963. The data is corrected for normal moveout and statics and thereafter stacked.

Common depth point seismic techniques are generally credited with producing better seismic data than those techniques which produced singlefold seismic data. In stacking the common depth point seismic data, the primary reflections are essentially in phase and thus are added whereas the distortions such as multiple reflections are out of phase and tend to be cancelled. Thus the multiple reflections are suppressed and the primary reflections are enhanced.

Common depth point seismic techniques, in addition to yielding improved seismic data, also enable determinations to be made of velocity parameters of the earth. A knowledge of the velocity parameters of the earth from which seismic data is obtained is extremely important in the processing and interpretation of the seismic data. Various methods have been employed for obtaining velocity parameters from seismic data. One such method is described in U.S. Pat. No. 3,417,370 to Brey, which shows a typical system in which signal detection techniques are used to estimate acoustic velocity from seismic traces. Another method of obtaining velocity parameters is described in U.S. Pat. No. 3,651,451 to Ruehle. In accordance with the Ruehle patent, an index array of travel time curves specifying T versus X for a set of velocities passing through sample points on the outer trace of a common depth point set is computed. Seismic reflections in the traces are identified by detecting the signal across the traces along the travel time curves. In one particular signal detection technique, the traces are summed along each of the travel time curves in the set and the maximum signal power identifies the proper velocity.

Recently, workers in the field have transformed X-T seismic arrays representing amplitude of seismic reflections as a function of time and distance into f-k arrays representing amplitude as a function of frequency and wave number. My co-pending application, referred to above, and the prior art referred to therein, show the use of f-k transforms of seismograms. My co-pending application shows the filtering of the co-pending application, referred to above, and the prior art f-k transforms of seismic sections. The disclosure of that application is incorporated by reference herein.

While the foregoing, and other field procedures and processing techniques have been successfuly used, a need exists for improved multiple reflection suppression techniques.

SUMMARY OF THE INVENTION

In accordance with the present invention, multiple reflections are filtered from a seismic section which has been converted into an f-k array by weighting all samples in the f-k array with the inverse of the f-k transform of the multiple reflections.

In carrying out the invention in one form thereof, a set of seismic traces is normal moveout corrected with the apparent velocity of the multiple reflections. This aligns the multiple reflections in the CDP set. By stacking the normal moveout corrected CDP set, an estimate is obtained of the multiple reflections. This estimate is successively time shifted by varying times to produce seismograms representing a CDP set of the multiple reflections. The multiple relfection CDP set is converted into an f-k array and the inverse of this array is obtained. This is an array of samples which are inversely proportional to the amplitude of the multiple reflections as a function of frequency and wave number.

The seismic section from which multiple reflections are to be filtered is also converted into an f-k array. This f-k array is filtered by weighting all samples in it by the corresponding samples in the inverse multiple reflection f-k array. In this manner, multiple reflections are suppressed. When the filtered f-k array is converted into a normal X-T array, an enhanced representation of the earth's formations without multiple reflections is obtained.

The foregoing and other objects, features and advantages of the invention will be better understood from the following more detailed description and appended claims.

SHORT DESCRIPTION OF THE DRAWINGS

FIG. 3 depicts the CDP set of FIG. 1 after normal moveout correcting with the apparent velocity of the multiple reflections;

FIG. 8 depicts the sets of FIG. 6 after multiple reflections have been filtered out in accordance with the present invention;

DESCRIPTION OF THE PREFERRED EMBODIMENT

Figure 1:
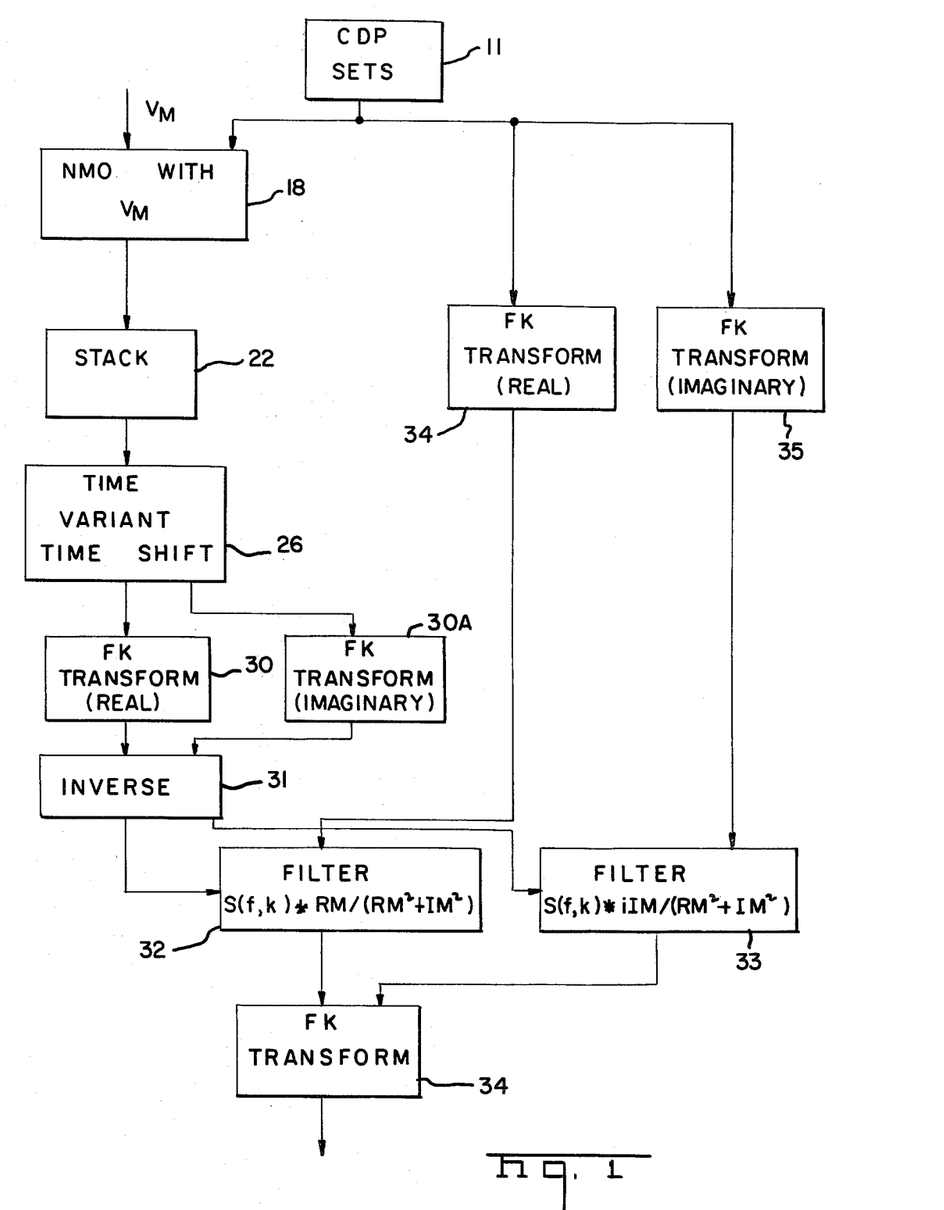
FIG. 1 is a flow sheet depicting the invention.
Figure 2:
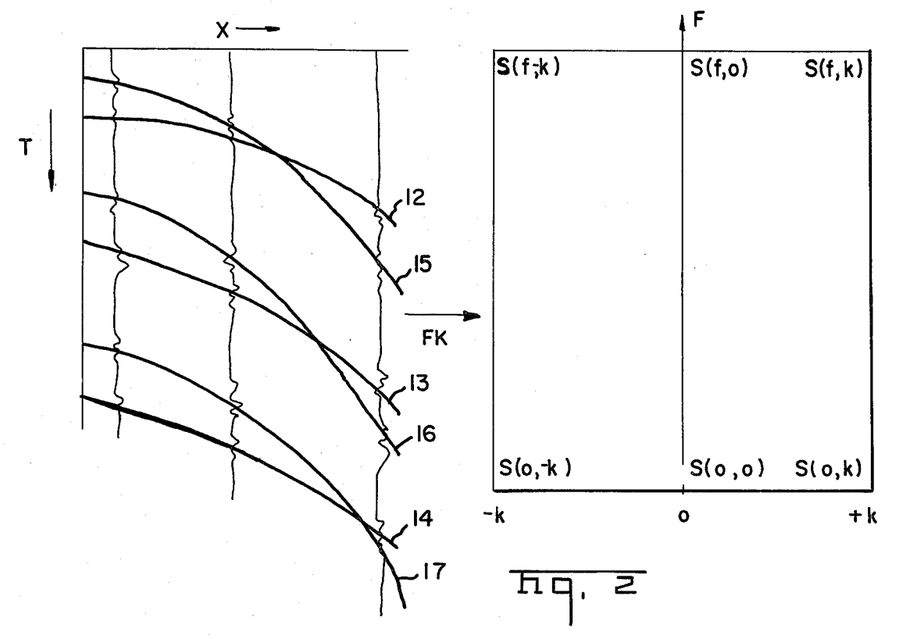
FIG. 2 depicts a set of CDP seismograms, and the f-k transform of that set.

Referring to FIG. 1, this invention relates to a method of filtering multiple reflections from sets of common depth point seismograms 11. Such CDP sets are depicted in FIG. 2, wherein the X direction depicts distance along a line of exploration and the T direction depicts time after the pulse of seismic energy producing the seismograms. In accordance with CDP techniques, the seismograms in each set have reflections of seismic energy from the same reflecting points in the subsurface. As is well known, the reflections from subsurface interfaces occur in the sets along approximately hyperbolic arcs such as 12, 13 and 14 in FIG. 2. The time of a reflection in any set is given by the well known expression:

$$T^2 = T^2_O + X^2/V^2$$

where $T_O$ is the time of the reflection at the zero offset trace, X is the horizontal distance between source and detector, and V is the acoustic velocity characteristic of the earth. It is also well known that multiple reflections line up along different hyperbolic arcs such as 15, 16 and 17 in FIG. 2. Such a seismic set is generated in the field and stored on magnetic tape or in a digital computer as an array of seismic samples representing the amplitude of the seismic reflections as a function of time T and distance X along the line of exploration. The samples in such an array are designated S(X,T). Fourier transforms which convert such an array into an array of amplitude as a function of frequency and wave number are known. Such an f-k array is shown at the right side of FIG. 2. The digital samples are denoted S(f,k).

As a first step toward obtaining seismograms representing only multiple reflections, the CDP sets 11 are normal moveout corrected with the apparent velocity $V_m$ of the multiple reflections. This step is indicated at 18 in FIG. 1. It produces the seismic set which is depicted in FIG. 3. In this set, the multiple reflections have been aligned so that they appear on the straight lines 19, 20 and 21. When such a set is stacked, an estimate of the mutliple reflections is obtained. The step of stacking is indicated at 22 in FIG. 1.

Figure 4:
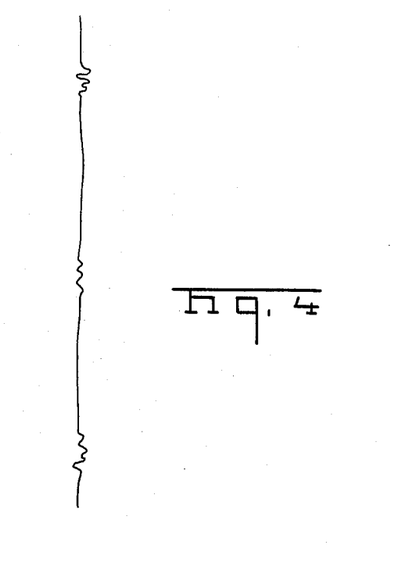
FIG. 4 depicts an estimate of multiple reflections obtained by stacking the CDP set of FIG. 3.
Figure 5:
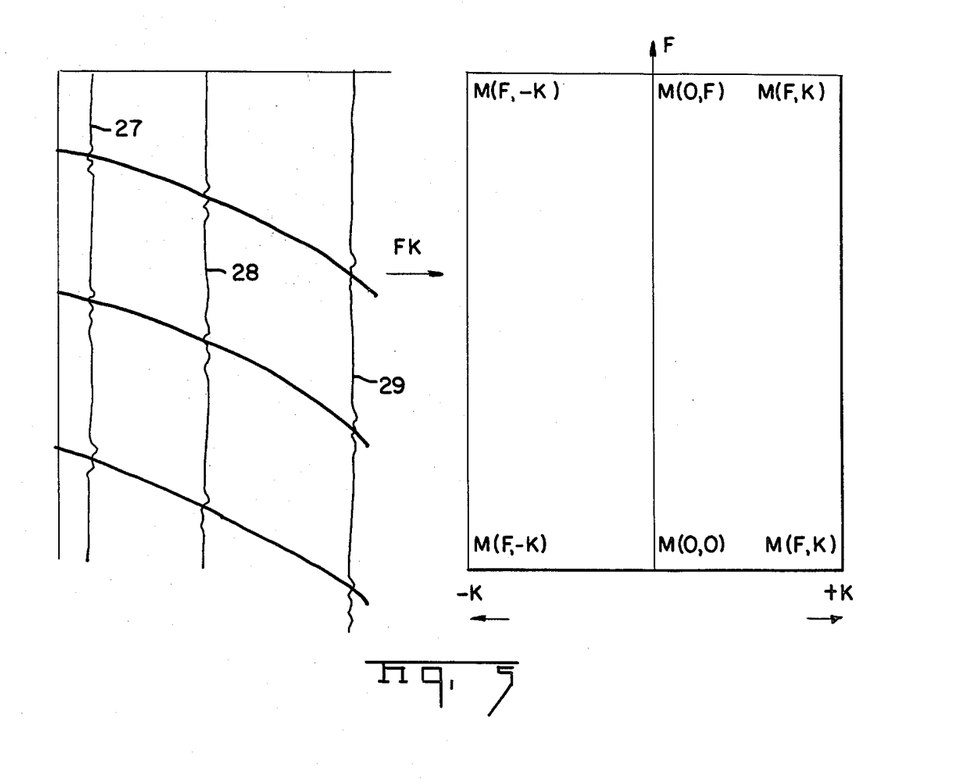
FIG. 5 depicts a set representing the multiple reflections which has been obtained by successively time shifting the estimate of FIG. 4.

The resulting estimate of the mutliple reflections is shown in FIG. 4 wherein the stacked seismogram has the multiple reflections 23, 24 and 25. This estimate is converted into a CDP set representing the multiple reflections. The time variant time shift indicated at 26 in FIG. 1 performs this operation. This is merely a time shifting operation which is the reverse of the normal moveout operation indicated at 18. That is, the apparent multiple velocity is used to determine the time shift to be successively applied to the estimate of FIG. 4 to produce the set representing multiple reflections in FIG. 5. FIG. 5 depicts the estimates 27, 28 and 29, each with successive time shifts, but of course there will be many more seismograms in the typical CDP set.

FIG. 5 also depicts the f-k transform of the set representing the multiple reflections. The set representing multiple reflections at the left in FIG. 5 is represented by an array of digital samples representing amplitude as a function of time and distance. The digital samples in such an array are designated M(X,T) where each digital sample represents an amplitude for a particular value of X and T. The right hand side of FIG. 5 depicts an array of digital samples for each frequency and wave number value in the array. The digital samples are designated M(f,k) where each digital sample represents the amplitude for a particular value of frequency and wave number.

The step of performing the f-k transform on the set representing multiples is indicated at 30 and 30A in FIG. 1. This step can be carried out by many conventional Fourier transforms, but the Cooley-Tukey transform described in Cooley, J. W.; Tukey, J. W., "An Algorithm for Machine Calculation of Complex Fourier Series", *Mathematical Computation*, Vol. 19, 1965, pp. 297–301 is particularly suitable for use. The adaptation of the transform for use in seismic processing is more fully described in my co-pending application referenced above and incorporated by reference. That application also describes in more detail the transform into a real part, indicated at 30, and the transform into an imaginary part, indicated at 30A.

In accordance with the present invention, the inverse of the array M(f,k) representing multiples, is obtained in order to determine the weights of the filter which is to be applied. This step of generating the inverse is indicated at 31 in FIG. 1. An inverse operation performed on an f-k array is carried out by division. That is, the weights, W(f,k) of the filter are the inverse of the mutliple reflection section. Stated in another way, $$W(f,k) = 1/M(f,k) = 1/(RM + iIM)$$

In the foregoing, RM represents the real part of the weighting function and iIM represents the imaginary part. In my co-pending application, multiples are removed by a reject filter which operates only on the absolute value of the transform of the seismic section. The filter of the present invention operates on the complex real and imaginary parts of the f-k transform of the seismic section. The operation is simplified by multiplying both the numerator and the denominator by RM − iIM. This produces:

$$W(f,k) = RM/(RM^2 + IM^2) - iIM/(RM^2 + IM^2)$$

The foregoing consists of two parts. One is the coefficients for filtering the real part of the seismic section. The other is the coefficients for filtering the imaginary part of the seismic section. The real coefficients are applied to the filter 32. The imaginary coefficients are applied to the filter 33.

The seismic section to be filtered is converted into an f-k array by the real f-k transform 34 and the imaginary f-k transform 35. Again, these f-k transforms are performed in accordance with the procedure set forth in my co-pending application. The real part of the array S(f,k) is applied to the filter 32 and the imaginary part is applied to the filter 33. The filters 32 and 33 weight each of the samples in the array S(f,k) by a factor which is inversely proportional to the amplitude of the corresponding sample in the f-k transform of the mutliple reflections. In implementing the filtering in a digital computer, the simplest procedure is to multiply each filter coefficient, from the inverse multiple reflection f-k array, by the corresponding sample in the seismic section f-k array. Digital filtering techniques are well known. The filtering has the effect of suppressing multiple reflections. The filtered arrays are transformed back into normal X-T arrays by the step indicated at step 34. This produces a section having enhanced representation of the earth's formation without the multiple reflections.

Figure 6:
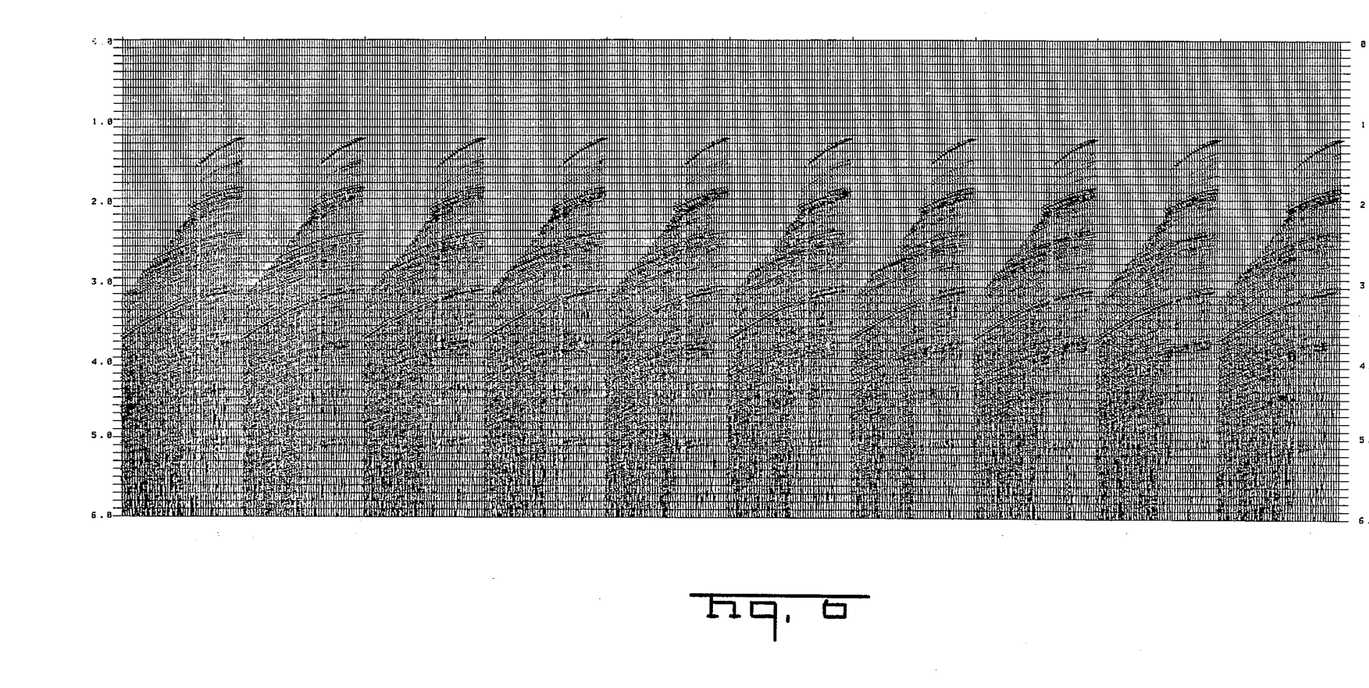
FIG. 6 is an example of sets of CDP seismograms.
Figure 7:
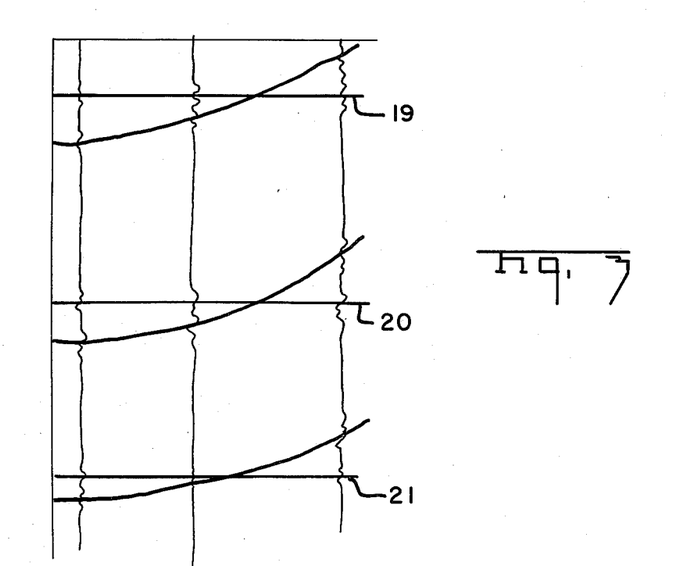
FIG. 7 shows sets of seismograms representing the multiple reflections in the sets of FIG. 6.

Examples of the operation of the present invention are shown in the seismograms of FIGS. 6–10. FIG. 6 depicts field seismograms in ten CDP sets. This corresponds with the idealized set shown in FIG. 2. After processing by the steps 18, 22 and 26 of FIG. 1, these field seismograms have the appearance of FIG. 7. FIG. 7 shows sets representing only multiple reflections. These sets are converted into an f-k array by the steps 30 and 30A of FIG. 1 and the weighting coefficients of the filter are determined by the inverse operation depicted at 31 in FIG. 1.

FIG. 8 shows seismic sets which have been transformed into an f-k array, filtered by the steps 32 and 33 of FIG. 1 and then transformed back into an X-T array. Good multiple suppression has been obtained.

Figure 9:
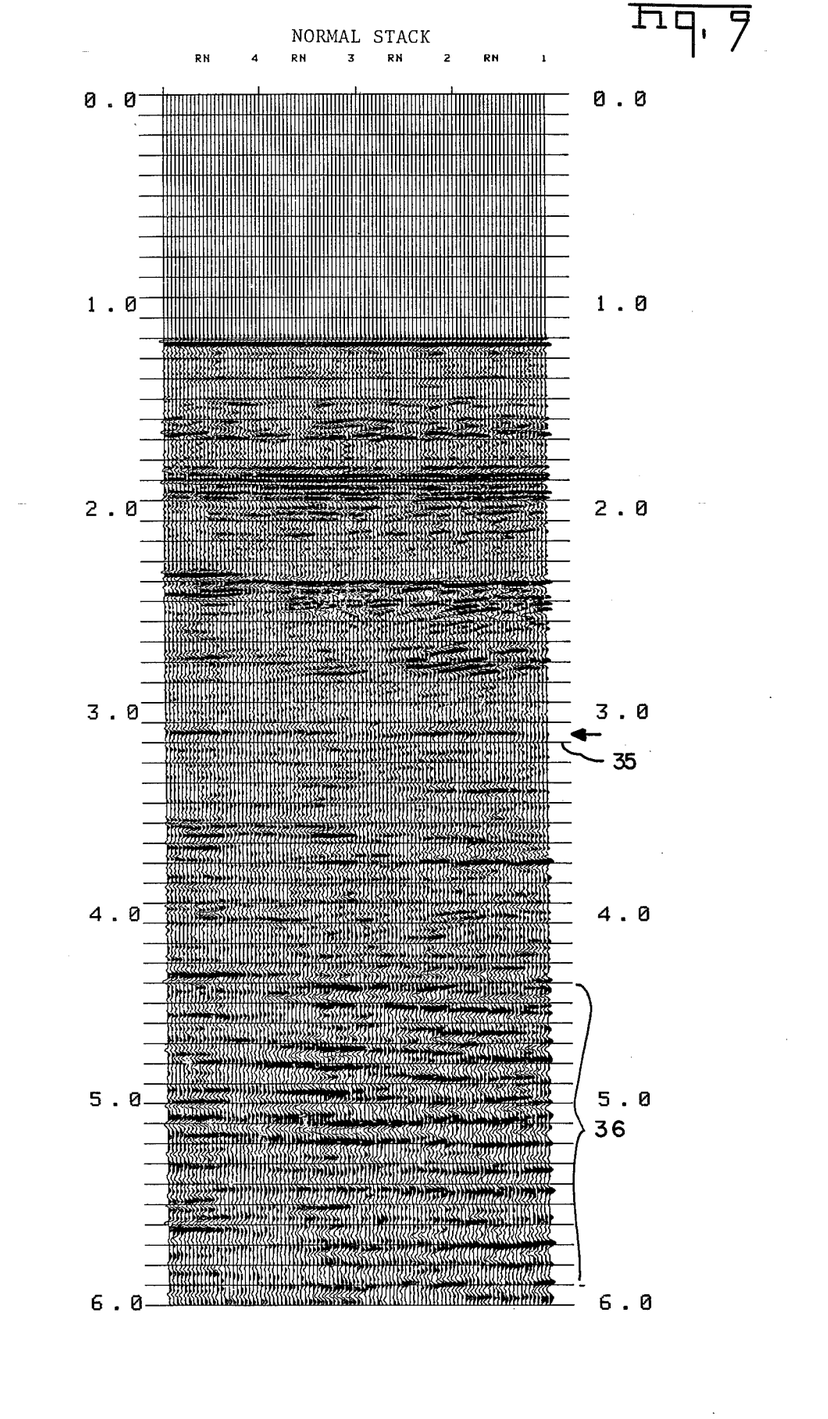
FIG. 9 is an example of a field section which has been processed and stacked with standard procedures.
Figure 10:
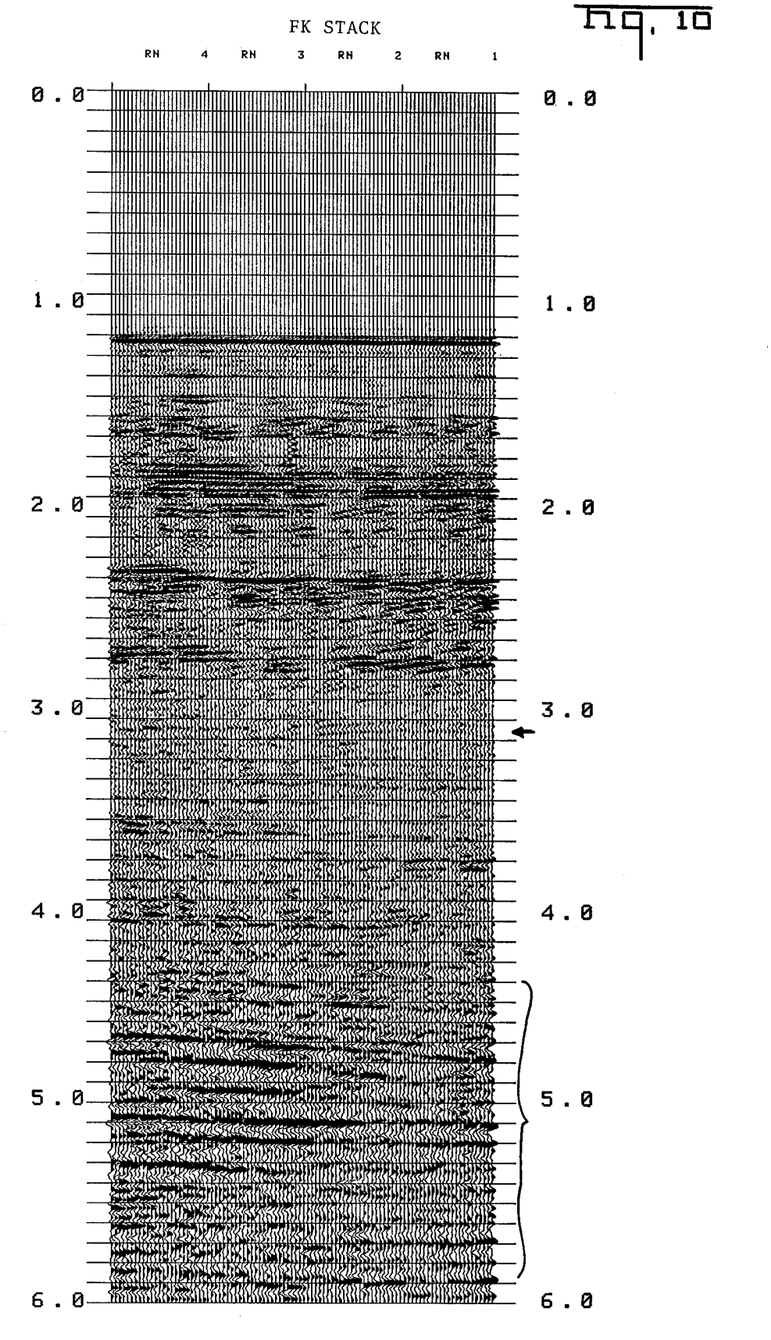
FIG. 10 depicts the same seismograms after the f-k multiple reflection filtering and stacking of the present invention.

FIGS. 9 and 10 are another example of the effectiveness of the present invention. FIG. 9 shows a seismic section which has been stacked after standard processing. Note the strong multiple reflection indicated at 35, approximately 3.15 seconds record time. Also there is severe ringing caused by multiple reflections in the portion of the record indicated at 36, approximately 4.4 through 6.0 seconds of record time.

FIG. 10 is the same seismic section which has been processed and stacked by the same processing except that the f-k multiple filtering of the present invention has been applied. Note that the multiple reflection at 3.15 seconds has been effectively suppressed. Also, the ringing between 4.4 and 6.0 seconds has been greatly improved.

The apparatus and programming required to practice the invention will be apparent to those skilled in the art from the foregoing, from my co-pending application, and from the users' manual for the particular computer system employed.

While a particular embodiment of the invention has been shown and described, various modifications are within the true spirit and scope of the invention. The appended claims are, therefore, intended to cover all such modifications.

I claim:

1. A method of filtering multiple reflections from seismograms representing the earth's formations comprising:

(a) generating first seismograms representing the amplitude of seismic primary and multiple reflections as a function of time and distance along a line of exploration;

(b) transforming said first seismograms into an f-k array of first real and first imaginary parts representing amplitude as a function of frequency and wave number;

(c) normal moveout correcting said first seismograms with the apparent velocity of said multiple reflections to align said multiple reflections;

(d) stacking said normal moveout corrected first seismograms having aligned multiple reflections, (e) inverse normal moveout correcting said stacked first seismograms to produce second seismograms representing multiple reflections, (f) transforming said second seismograms with aligned multiple reflections into an f-k array of second real and second imaginary parts, (g) determining the inverse of said second real and second imaginary parts of the f-k array of said second seismograms, (h) filtering said first real part of the f-k array of said first seismograms by weighting all samples of said first real part with corresponding samples of the inverse of said second real part of the f-k array of said second seismograms, (i) filtering said first imaginary part of the f-k array of said first seismograms by weighting all samples of said first imaginary part with corresponding samples of the inverse of said second imaginary part of the f-k array of said second seismograms, and (j) transforming said filtered first real and first imaginary parts into third seismograms representing an enhanced representation of the earth's formation with suppressed multiple reflections as a function of time and distance along said line of exploration.

2. The method recited in claim 1 wherein said step of filtering said first real part of the f-k array of said first seismogram is performed by multiplying each of the samples in said f-k array by a factor which is inversely proportional to the amplitude of the corresponding sample in the f-k transform of said second real part of said second seismograms and said step of filtering said first imaginary part of the f-k array of said first seismogram is performed by multiplying each of the samples in said f-k array by a factor which is inversely proportional to the amplitude of the corresponding sample in the f-k transform of said second imaginary part of said second seismograms.

* * * * *